(12) United States Patent
Liao et al.

(10) Patent No.: US 10,928,324 B2
(45) Date of Patent: Feb. 23, 2021

(54) STIMULATED RAMAN SPECTROSCOPIC MICROSCOPE BY RESONANT DELAY-LINE TUNING

(71) Applicants: Purdue Research Foundation, West Lafayette, IN (US); Chien-Sheng Liao, Brighton, MA (US); Pu Wang, West Lafayette, IN (US); Ji-Xin Cheng, Newton, MA (US)

(72) Inventors: Chien-Sheng Liao, Brighton, MA (US); Pu Wang, West Lafayette, IN (US); Ji-Xin Cheng, Newton, MA (US)

(*) Notice: Subject to any disclaimer, the term of this patent is extended or adjusted under 35 U.S.C. 154(b) by 0 days.

(21) Appl. No.: 16/470,119

(22) PCT Filed: Dec. 14, 2017

(86) PCT No.: PCT/US2017/066424
§ 371 (c)(1),
(2) Date: Jun. 14, 2019

(87) PCT Pub. No.: WO2018/118646
PCT Pub. Date: Jun. 28, 2018

(65) Prior Publication Data
US 2019/0360937 A1 Nov. 28, 2019

Related U.S. Application Data

(60) Provisional application No. 62/435,906, filed on Dec. 19, 2016.

(51) Int. Cl.
*G01J 3/44* (2006.01)
*G01N 21/65* (2006.01)
(Continued)

(52) U.S. Cl.
CPC ............ *G01N 21/65* (2013.01); *G01J 3/10* (2013.01); *G01J 3/433* (2013.01); *G01J 3/44* (2013.01); *G01N 2021/655* (2013.01)

(58) Field of Classification Search
CPC ............ G01N 21/65; G01N 21/658; G01N 2021/656; G01J 3/44; G01J 3/02
(Continued)

(56) References Cited

U.S. PATENT DOCUMENTS

2010/0188496 A1* 7/2010 Xie ..................... G01J 3/10
348/79
2013/0162994 A1* 6/2013 Xie ..................... G01N 21/171
356/342

OTHER PUBLICATIONS

Liao et al., "Stimulated Raman spectroscopic imaging by microsecond delay-line tuning." 1-20 Optica, vol. 3, No. 12, Nov. 15, 2016 (Nov. 15, 2016), pp. 1377-1378 [online] [retrieved on Mar. 16, 2018] <URL: http://sites.bu.edu/cheng-group/files/2017/10/10-Liao-Optica-3-12-1377 .pdf> (Year: 2016).*

* cited by examiner

*Primary Examiner* — Md M Rahman
(74) *Attorney, Agent, or Firm* — Tyler B. Droste; Gutwein Law

(57) ABSTRACT

A microsecond-scale stimulated Raman spectroscopic imaging system having a light source, such as a laser output that provides two femtosecond laser beams and a modulator to modulate the laser intensity at frequency between about 1 and about 100 megahertz. The system can further include a medium that chirps the two femtosecond beams to generate a spectral focus in a specimen, and a galvo mirror or resonant mirror pair to scan the two femtosecond beams in two dimension on the specimen. An objective lens can focus the two laser beams into a specimen or sample and a resonant delay scanner configured to produce an optical
(Continued)

delay to the pair of chirped beams in said specimen and a tuned amplifier or lock-in amplifier can be used to extract the stimulated Raman-signal shift at the aforementioned modulation frequency.

20 Claims, 15 Drawing Sheets

(51) Int. Cl.
*G01J 3/10* (2006.01)
*G01J 3/433* (2006.01)

(58) Field of Classification Search
USPC .......................................................... 356/301
See application file for complete search history.

STIMULATED RAMAN SPECTROSCOPIC MICROSCOPE BY RESONANT DELAY-LINE TUNING

CROSS-REFERENCE TO RELATED APPLICATION

This PCT Patent Application Patent Application claims priority to U.S. Provisional Application: 61/435,905 filed Dec. 19, 2016, the disclosure of which is considered part of the disclosure of this application and is hereby incorporated by reference in its entirety.

GOVERNMENT RIGHT

This invention was made with government support under CA182608 and GM114853 awarded by National Institute of Health. The government has certain rights in the invention.

FIELD OF THE INVENTION

This disclosure is related to optical microscopy and imaging systems. More specifically, the present disclosure is directed to microsecond-scale stimulated Raman spectroscopic imaging system.

BACKGROUND

Coherent Raman imaging techniques, including coherent anti-Stokes Raman scattering (CARS) and simulated Raman scattering (SRS), are powerful tools to visualize the spatial distribution of molecules in cells or tissues. By coherent excitation of a single molecular vibration, the imaging speed at a narrow spectral window has been improved up to video rate. In order to resolve overlapped Raman bands in biological samples, there has been a great effort in developing spectroscopic coherent Raman imaging technology. Spectral scanning of a narrowband laser pulse and collection of images at a series of Raman shifts has reached the speed of a few seconds per stack. The limited temporal resolution of each spectroscopic measurement on second scale might distort spectral profiles from highly dynamic organelles in live cells or animals. Multiplex CARS by a broadband excitation pulse and a narrowband probe pulse has been demonstrated to simultaneously excite multiple Raman bands and detect spectrally dispersed vibrational signals with a pixel dwell time as short as 3 milliseconds. Recently multiplex and frequency-multiplexing SRS has further reached microsecond spectral acquisition and enabled real-time spectroscopic imaging.

The present disclosure provides an apparatus and method of providing femtosecond pulses for spectroscopic measurement that can linearly chirp the pump and Stokes pulses and focus their entire bandwidth into a narrow spectral region. By using this method each temporal delay between the chirped pulses can correspond to a Raman shift. By scanning the temporal delay of one of pulses and recording a series of images, SRS spectroscopic imaging based on this spectral focusing scheme has been demonstrated with a total acquisition time of several tens of seconds, where the spectral acquisition speed was limited by the waiting time for stabilization and communication of a motorized translational stage used for delay tuning. There exists a need for a system and method for providing improved resolution of the spectroscopic measurement in order to prevent distortion of the spectral profiles.

BRIEF SUMMARY OF THE INVENTION

A microsecond-scale stimulated Raman spectroscopic imaging system is provided herein. The system comprises a light source, such as a laser output that provides two femtosecond pulses and a modulator to modulate the laser intensity at frequency between about 1 and about 100 megahertz. The system can further include a medium that chirps the two femtosecond pulses to generate a spectral focus in a specimen, and a galvo mirror or resonant mirror pair to scan the two femtosecond pulses in two dimension on the specimen. An objective lens that focuses the two laser pulses into the specimen can be used. A resonant delay scanner configured to produce an optical delay to the pair of chirped pulses in said specimen and a tuned amplifier or lock-in amplifier can be used to extract the stimulated Raman-signal shift at the aforementioned modulation frequency. The optical delay may be about 0.5-10 picosecond within about 20-2000 microsecond. One exemplary embodiment can have about 3 picoseconds optical delay within about 42 microseconds, and such delay can generate a Raman-signal shift window of about 10-500 wavenumbers through the pair of chirped pulses, preferably about 200 wavenumbers. The system can use a resonant delay line tuning system/scanner to produce an optical delay of about 3 picoseconds within about 42 microseconds through a pair of chirped pulses and generate a Raman shift window to enable early detection of microorganisms and compositional mapping of intracellular compartments in a living organism.

Similarly, the disclosure provides a method of imaging a specimen by generating a first and second laser beam. One or more of the laser beam frequencies can be modulated using a modulator. An optical delay of least one of the beams to the specimen can be produced using a delay-line tuning system. A spectral focus on the specimen can be generated by chirping the first beam and second beam using a medium, which can generate a Raman-signal shift. The first beam and second beam can be scanned two dimensionally as they contact the specimen. Scattered photons from the specimen can then be detected using a photodiode. Additionally, the Raman-signal shift at a pre-determined modulation frequency can be extracted.

The disclosure also provides method of using a resonant delay-line tuning Raman spectroscopic imaging system of the present disclosure to detect images of microorganisms and other intracellular compartments in a dynamic living system. The system of the present disclosure scans laser pulses by directing the light to the edge of a tilted resonant mirror that can be focused by a lens on a flat mirror. The retro-reflected light experiences a millimeter scale difference in optical path when the resonant mirror is scanned. Combined with two linear chirped femtosecond pulses, each optical path difference corresponds to a specific Raman mode in a stimulated Raman spectroscopic microscope.

Examples of using this disclosed technology and system to view live microorganism and intracellular compartments are provided herein. These and other features, aspects and advantages of the present invention will become better understood with reference to the following figures, associated descriptions and claims.

BRIEF DESCRIPTION OF THE DRAWINGS

The features and advantages of this disclosure, and the manner of attaining them, will be more apparent and better understood by reference to the following descriptions of the disclosed system and process, taken in conjunction with the accompanying drawings, wherein.

DETAILED DESCRIPTION OF THE INVENTION

While the concepts of the present disclosure are illustrated and described in detail in the figures and the description herein, results in the figures and their description are to be considered as exemplary and not restrictive in character; it being understood that only the illustrative embodiments are shown and described and that all changes and modifications that come within the spirit of the disclosure are desired to be protected. Unless defined otherwise, the scientific and technology nomenclatures have the same meaning as commonly understood by a person in the ordinary skill in the art pertaining to this disclosure.

Spectral distortion in stimulated Raman spectroscopic imaging is caused by slow delay-line tuning on second or millisecond scale. The optical path difference in a stimulated Raman spectroscopic microscope is conventionally scanned by a motorized translational stage on which a mirror reflects the laser pulses. The tuning speed of delay-line is in need of improvement from millisecond scale to microsecond. A faster response time to reflect the laser pulses is developed in this disclosure. The present disclosure overcomes the abovementioned limitation and demonstrate SRS spectroscopic imaging using a microsecond delay-line tuner as shown in FIG. 1A.

Figure 1A:
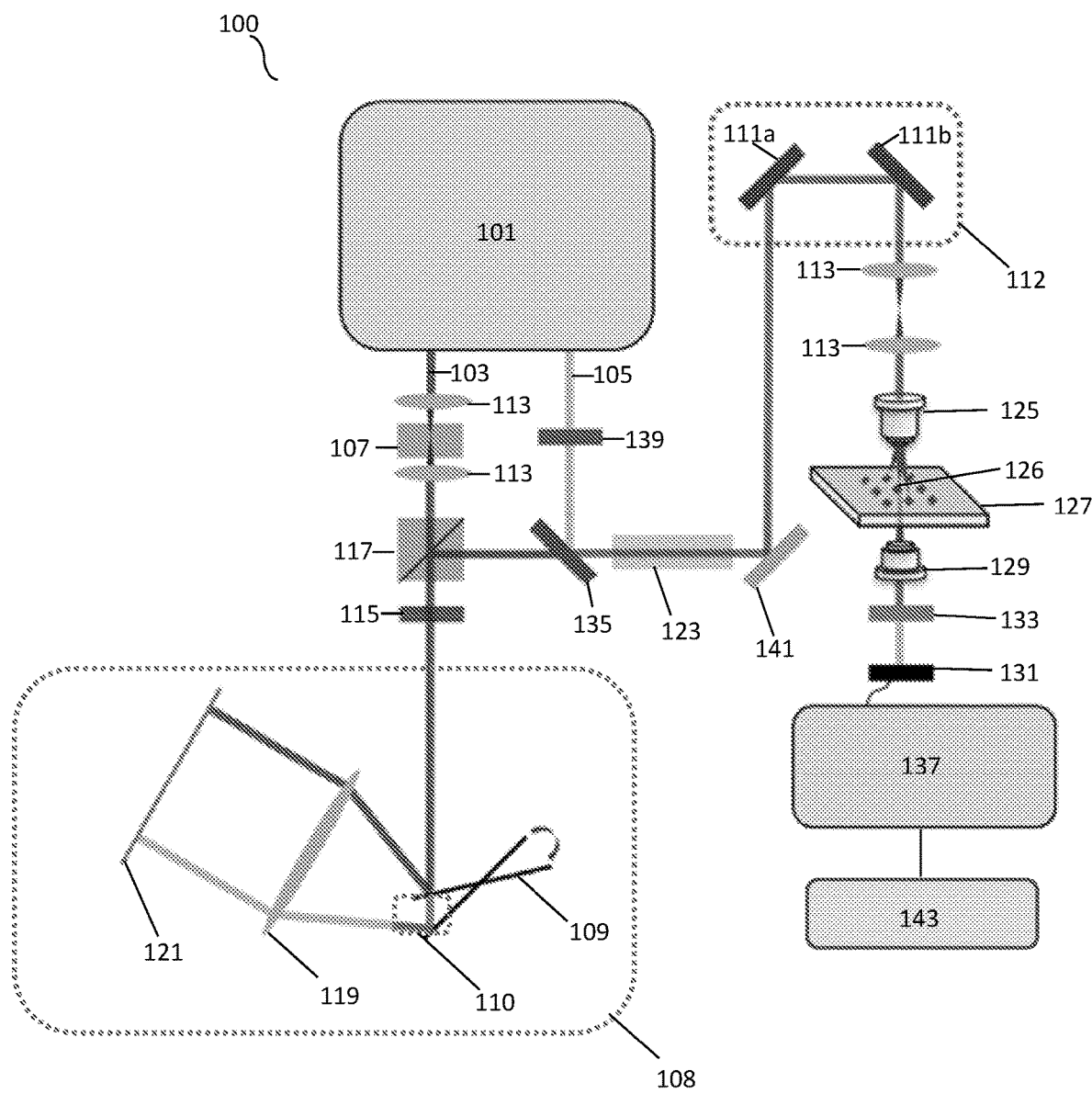
FIG. 1A shows a schematic illustration of a SRS spectroscopic imaging microscope of the present disclosure.

As illustrated in FIG. 1A, a system 100 in accordance with an embodiment of the present disclosure can include a light source 101. The light source can generate a Stokes beam 103, as well as a pump beam 105. One or more of the beams can pass through one or more lenses 113 to focus the beams throughout the system 100. The system can also use other various polarization modification units, such as a quarter wave plate (QWP) 115 and half wave plate (HWP) 139. An acousto-optic modulator (AOM) 107 can be used for intensity-modulation of one or more of the beams. In some exemplary embodiments, the modulator can modulate one or both of the beams intensity at a frequency between about 1 and 100 megahertz. Similarly, one or more optical filters can be used to filter out specific wavelengths of light emitted by the light source 101 and passed throughout the system 100. Additionally, the system can include a polarizing beam splitter (PBS) 117 for splitting the light of one or more of the emitted beams from the light source 101. The system can further use a delay-line tuning system 108 having one or more resonant mirrors 109. The delay-line tuning system 108 can collimate the light from one or more of the beams that is directed to the edge of a tilted resonant mirror 109. The beam reflected by the tilted resonant mirror 109 can be focused with a lens 119 onto a mirror 121. In some exemplary embodiments, the mirror can be a flat mirror. The beam that is retro reflected experiences a millimeter-scale difference in optical path, when the galvo mirror system 112 is scanned. FIG. 1A illustrates the path difference 110 created by the delay-line tuning system 108. After the beam leaves the delay-tuning system 108, the beam can pass through a filter or dichroic mirror 135 to help eliminate non-resonant background before passing through a rod 123 and reaching one or more mirrors 111 of the galvo mirror system 112.

After the beams have been combined and exit the galvo mirrors 111a,b of the galvo mirror system 112, the system

100 can utilize one or more lenses 125 that can collimate both beams. In one embodiment, an objective lens 125 can be used to focus the beams on a sample/specimen 126 on a sample stage 127. One or more lenses 129, such as a condenser, can be used to collect back-scattered photons and focus them onto a photodiode 131. In one exemplary embodiment, a photodiode 131 can use a filter 133 to block out various wavelengths and/or select for certain wavelengths to pass through to the photodiode 131. The photodiode 131 can be communicatively coupled to a rectifier 137, such as tuned amplifier (TAMP) or lock-in amplifier, to extract the stimulated Raman-signal shift at the aforementioned modulation frequency once the beam is obtained by the photodiode 131. Additionally, the system 100 can use one or more mirrors 141 to direct the path of one or more of the beams. The system 100 can be communicatively coupled to a processing means, such as a computer that is configured to obtain the recorded data. The computer can include a memory and a processing unit. The computer can be coupled to a display for providing images to a user.

Figure 5:
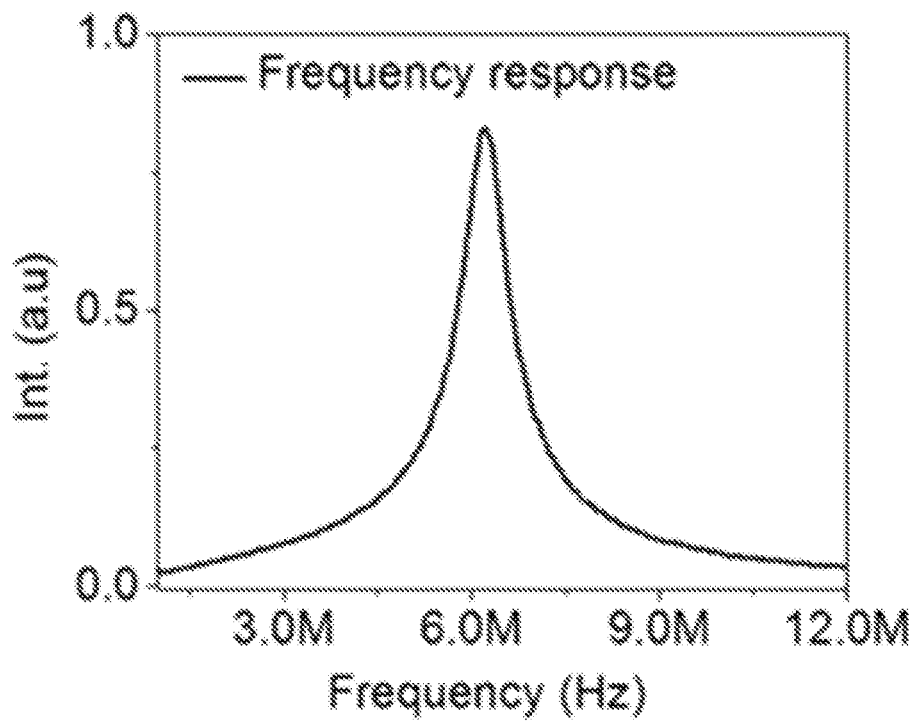
FIG. 5 shows a graphical illustration of the frequency response of the resonant circuit.

For the resonant circuit, a rectifier 137, such as a digital lock-in amplifier (e.g. HF2LI, Zurich Instrument) can be used to sweep the frequency from about 1 MHz to about 12 MHz and send the sinusoidal function to the driver of an AOM 107. This can provide the intensity of a 1040 nm beam to be modulated and then detected by a photodiode 131 (e.g. S3994, Hamamatsu) that is included in the resonant circuit of the system 100. As illustrated in FIG. 5, one exemplary embodiment of the present disclosure can have a central frequency of about 6.2 MHz and a bandwidth of about 700 kHz.

In one exemplary embodiment, the light source 101 can be a tunable 80 MHz pulsed laser (e.g. InSight, Spectra Physics) for providing two synchronized outputs. Similarly, any suitable laser generator may be used, including a dual output femtosecond laser generator. The outputs may include a Stokes beam 103 and pump beam 105. In one exemplary embodiment, the Stokes beam 103 can have a fixed wavelength of about 1040 nm beam with about a 220 fs pulse width when being intensity-modulated by AOM 107 at about 6.2 MHz. The beam can be directed to the edge of a resonant mirror 109 (e.g. CRS 12 kHz, Cambridge) of a delay-line tuning system 108. The movement of the resonant mirror 109 can be used for spectral acquisition. In one exemplary embodiment, the spectral acquisition time for each pixel may be about 42 µs, and the pixel dwell time may be about 82 µs.

The light source 101 pulses can be focused using one or more lenses 113. A lens 119, such as an achromatic lens having about 100 mm focal length can be used, and the beam can be reflected by a flat mirror 121 back to the same path. A QWP 115 and a PBS 117 together can be used to retrieve the retro reflected beam pulses. For the pump beam 105, the tunable output from the light source 101 can provide a tuning range from about 680 nm to about 1300 nm. The pump pulse may have a pulse width of about 120 fs that may be rotated by a HWP 139 in order to match the polarization of the Stokes beam 103. The pump and Stokes beam pulses may then be combined and chirped by one or more rods 123. In one exemplary embodiment, the system 100 may use two 12.7-cm SF57 rods. In some exemplary embodiments, the rod(s) can have a refractive index between about 1.7 and 1.95. The pulse widths of pump 105 and Stokes 103 beams may be stretched to about 1.3 ps and about 0.8 ps, respectively, measured with an autocorrelator (e.g. PulseScope, APE). The combined pulses may then be sent to a laser scanning microscope or lens 125. In one exemplary embodiment, an objective lens 125, which may have a magnification of about 40× to about 80× (e.g. LUMPLFLN 40XW, UPLSAPO 60XW, Olympus) can focus the pulses on a sample 126. The maximum optical powers on a tested sample were about 12 mW for 800 nm and about 180 mW for 1040 nm, respectively. For biological samples, the optical powers were about 12 mW for 800 nm and about 80 mW for 1040 nm, respectively. The SRS signals may then be collected, filtered and detected by a photodiode 131 (e.g. S3994, Hamamatsu) incorporated with a resonant circuit. The central frequency of the resonant circuit may be about 6.2 MHz with about a 700-kHz bandwidth as shown in FIG. 5. The output signals from the resonant circuit may then be sent to a rectifier 137, such as a tuned amplifier with a bandwidth of about 707 kHz or a digital lock-in amplifier with a bandwidth of about 203 kHz (e.g. HF2LI, Zurich Instrument). The output data may then recorded at 5 MHz sampling rate with a digitizer 143 (e.g. ATS 460, AlazarTech). The data can be further stored on a memory of a processing means, such as a computer. Similarly, the digitizer 143 can be incorporated into a computer.

Figure 1B:
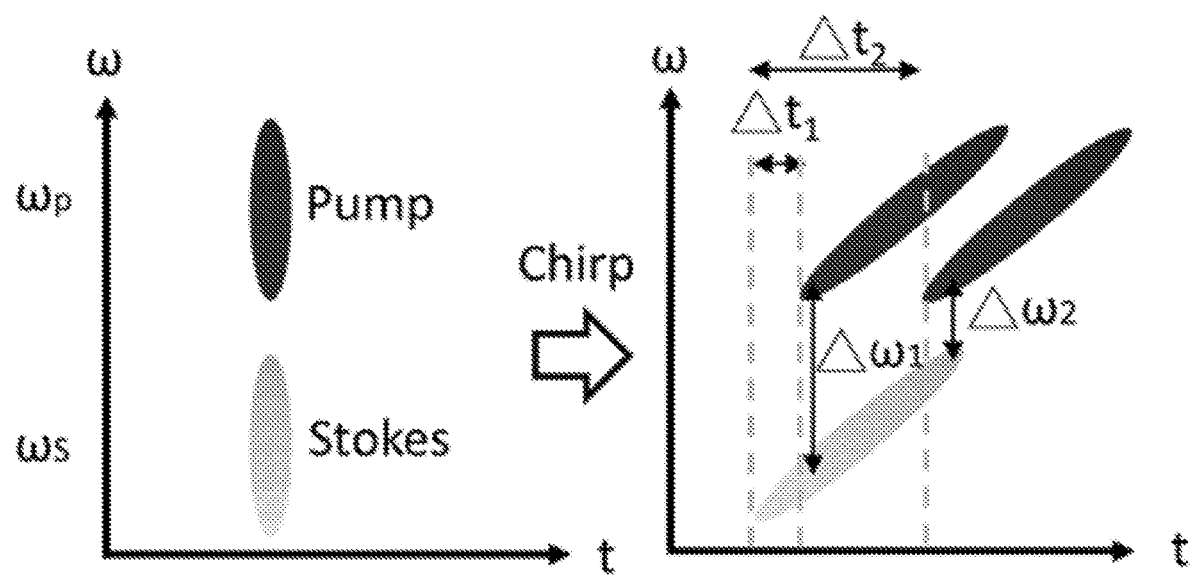
FIG. 1B is an illustrative schematic diagram showing the temporal delay between the chirped pump and Stokes corresponds to a molecular vibrational mode.

By directing collimated light to the edge of a tilted resonant mirror 109 with about a 1 to about 50 kHz central frequency, and focusing the reflected light with a lens 119 on a flat mirror 121, the retro-reflected light experiences a millimeter-scale difference in optical path when the resonant mirror 109 is scanned in one cycle of tens of microseconds. In one exemplary embodiment, a 12-kHz resonant mirror 109 can be implemented to scan the temporal delay between two chirped pulses for SRS spectroscopic imaging. The pump 105 and Stokes 103 pulses can be linearly chirped to efficiently utilize femtosecond pulses for spectroscopic measurement and focus their entire bandwidth into a narrow spectral region. Each temporal delay between the chirped pulses can correspond to a Raman shift, as illustrated in FIG. 1B. The pump beam 105 has a frequency of $\omega_p$ and the Stokes beam 103 has a frequency of $\omega_s$. By synchronization of the resonant mirror 109 with galvo-mirrors 111 used for imaging scanning, an SRS spectrum can be detected, covering about 200 $cm^{-1}$ determined by the excitation pulse, with pixel acquisition time of about 83 µs. This method can improve the temporal resolution of SRS spectra from seconds to microseconds compared to previous frame-by-frame methods utilizing a motorized stage. Through the improved spectral acquisition speed on a microsecond scale, chemical images from highly dynamic organelles in live cells and *C. elegans* are capable of being acquired.

Figure 2A:
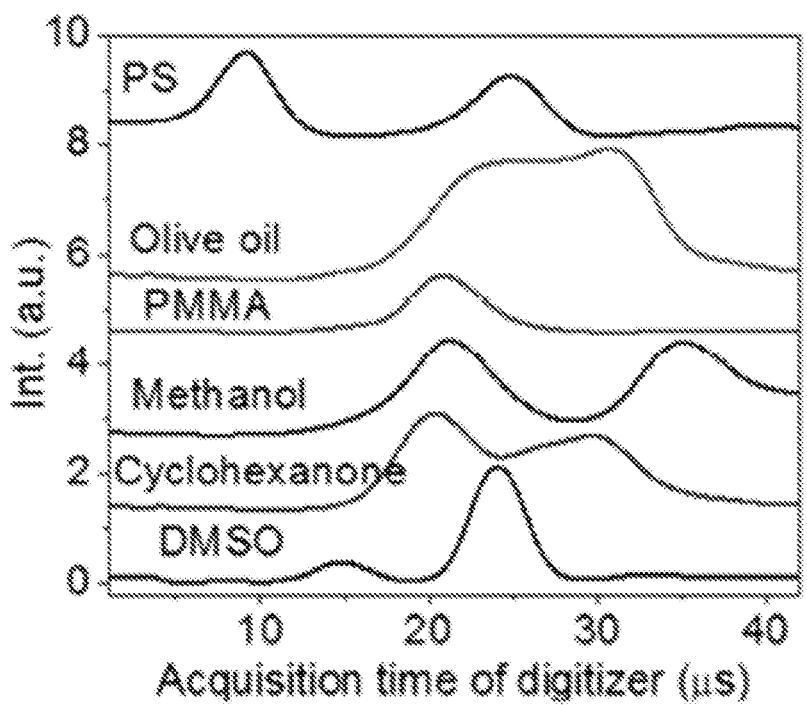
FIG. 2A shows a diagrammatic graphical illustration of a spectral data of raw spectra of polystyrene (PS), olive oil, poly(methyl methacrylate) (PMMA), methanol, cyclohexanone and dimethyl sulfoxide (DMSO) measured by an embodiment of the present disclosure.
Figure 2B:
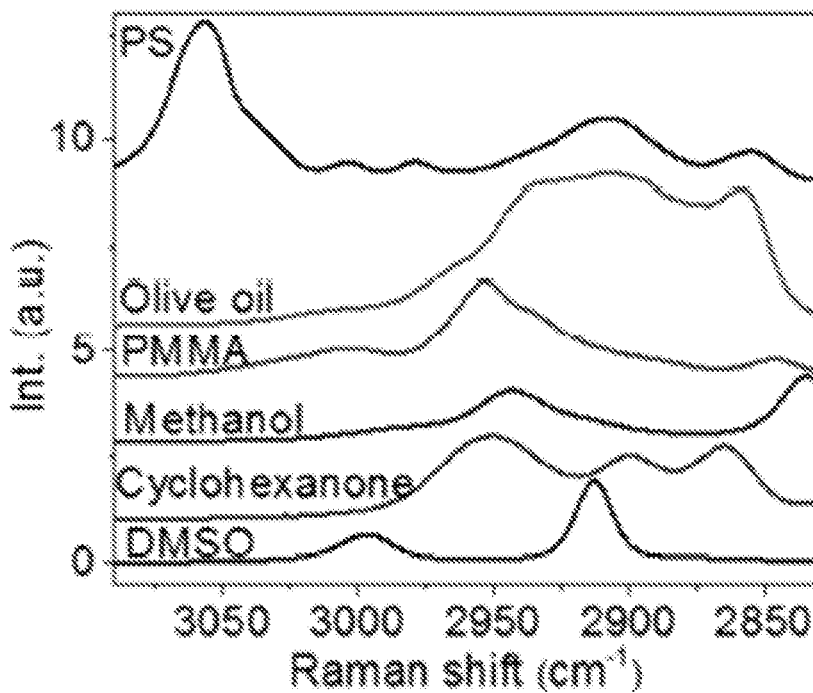
FIG. 2B shows a diagrammatic graphical illustration of a spectral data using spontaneous Raman spectroscopy of PS, olive oil, PMMA, methanol, cyclohexanone and DMSO measured by an embodiment of the present disclosure.
Figure 2C:
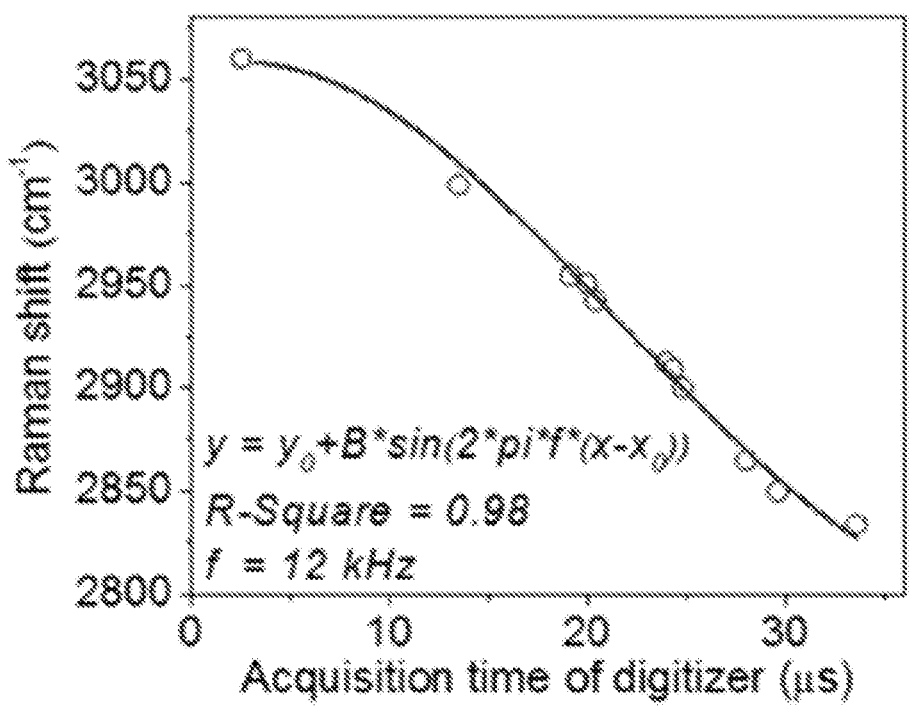
FIG. 2C shows a diagrammatic graphical illustration of the mapping of Raman shifts to acquisition time of a digitizer with a sinusoidal fitting.
Figure 2D:
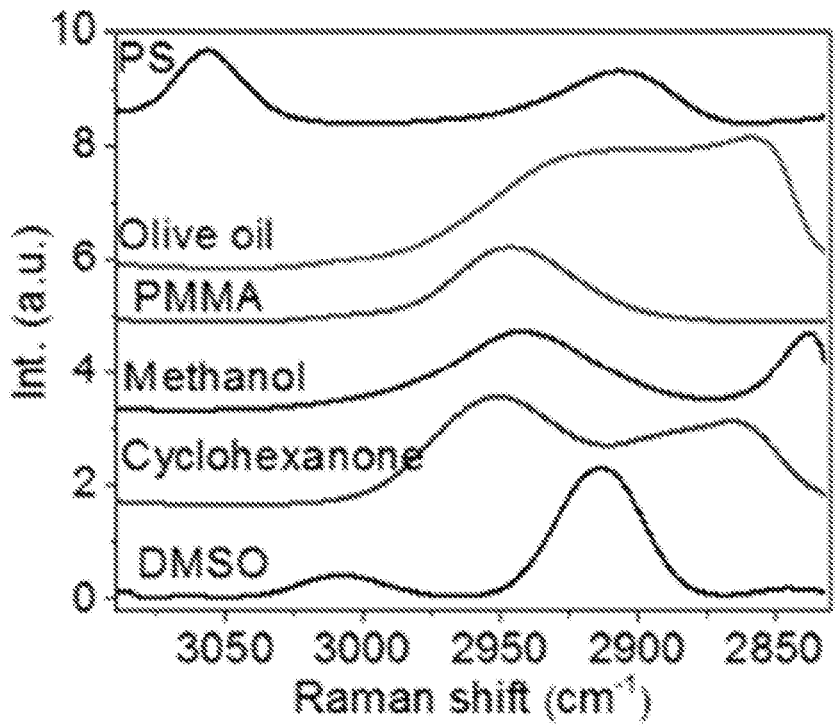
FIG. 2D is a calibrated spectra of FIG. 2A

In order to calibrate the Raman shift and compensate the nonlinearity of the resonant mirror 109, the spectral profiles acquired with the SRS spectroscopic of these present disclosure were used. As shown in FIG. 2A, the spectral profiles were compared to spontaneous Raman spectroscopy shown in FIG. 2B. Raman peaks from known chemicals can be used to construct a calibration curve. As shown in FIG. 2C, eleven known Raman peaks from six chemicals may be used to construct a calibration curve that was fitted with sinusoidal function. The fitted frequency may be 12 kHz, which can match the resonant frequency of the scanning mirror. The acquisition time of the digitizer 143 can then be converted into Raman shift shown in FIG. 2D. Furthermore, a spectral coverage of about 200 $cm^{-1}$ corresponding to 3 picoseconds in the optical delay-line tuning system 108 was confirmed by a motorized translational stage. In some exemplary embodiments, the optical delay may be about 0.5-10 picosecond within about 20-2000 microsecond. One exemplary embodiment can have about 3 picoseconds optical delay within about 42 microseconds, and such delay can generate a Raman-signal shift window of about 10-500 wavenumbers through the pair of chirped pulses, preferably about 200 wavenumbers.

Figure 6A:
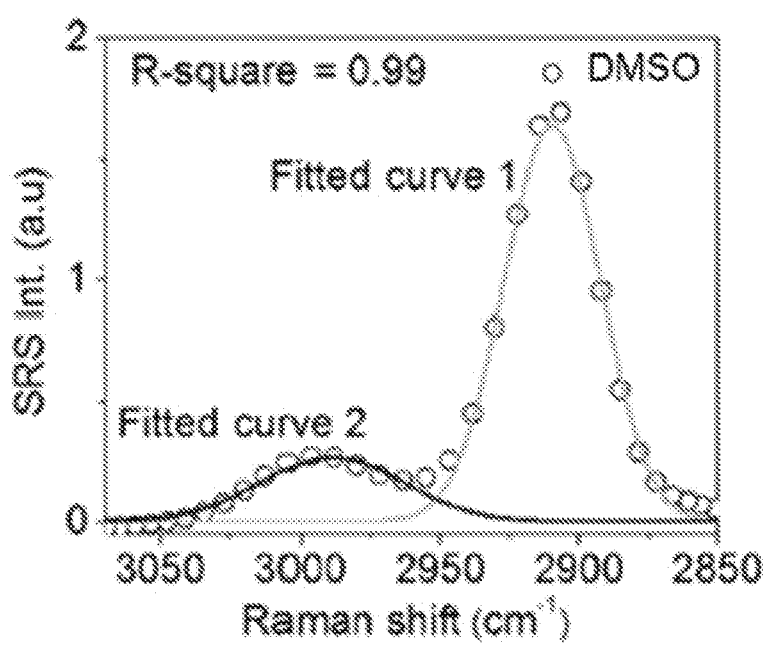
FIG. 6A shows a graphical illustration of spectral resolution tested by DMSO solution having a spectral resolution of 31 $cm^{-1}$ tested with a digital lock-in amplifier of 203 kHz bandwidth.
Figure 6B:
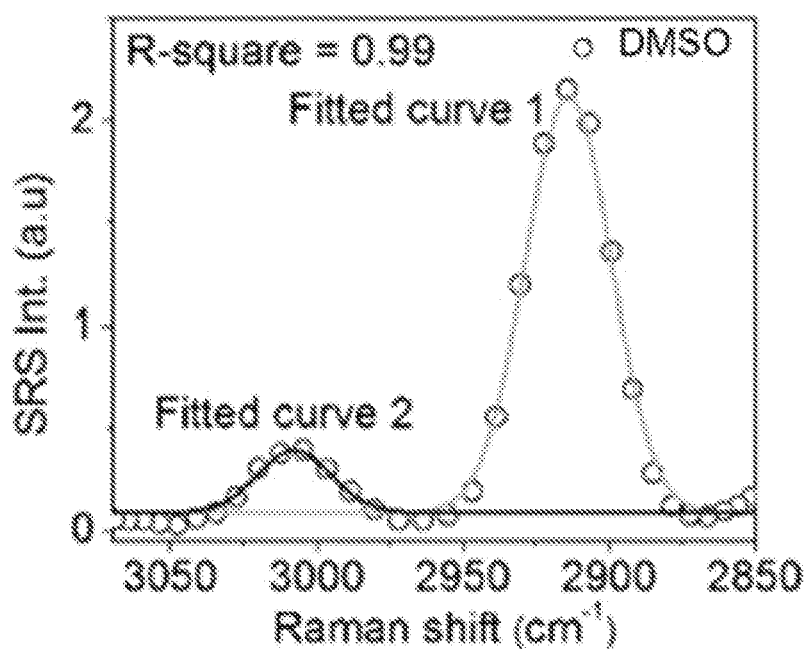
FIG. 6B shows a graphical illustration of spectral resolution tested by DMSO solution having a spectral resolution of 25 $cm^{-1}$ tested with the demodulation circuit of 707 kHz bandwidth.

The spectral resolution may be further characterized by using the known Raman peak of DMSO solution at 2912 $cm^{-1}$. FIG. 6A illustrates the spectral profile being fitted with multiple Gaussian peaks with origin and 31 $cm^{-1}$ spectral resolution and an estimate based on the measured 34 $cm^{-1}$ spectral width and the original Raman bandwidth of about 13 $cm^{-1}$ measured by spontaneous Raman spectroscopy. Using a rectifier 137, such as a digital lock-in amplifier with a bandwidth of about 203 kHz, 32 $cm^{-1}$ spectral resolution was achieved. The resolution can be further improved to 25 $cm^{-1}$ by a rectifier with a bandwidth of about 707 kHz as shown in FIG. 6B. The 25 $cm^{-1}$ spectral resolution was consistent with previous SRS spectroscopic imaging using a motorized translational stage for delay-line tuning, which indicates the response time of the rectifier 137 circuit is sufficient for the microsecond delay-line scanning.

Unlike previous Raman spectroscopy systems and methods, the only limiting factor to the spectral resolution of an exemplary embodiment of the system of the present disclosure is the chirping of laser pulses. Conventional motorized stage systems have a spectral resolution of about 25 $cm^{-1}$. While considering the spectral window of 200 $cm^{-1}$, the number of resolvable spectral points should be 200/25=8. In one exemplary embodiment, the system can have a scanning speed by a 12 kHz resonant mirror is n*12 kHz=38 kHz. The resonant circuit and rectifier both have about a 700 kHz bandwidth. The number of resolvable points can be 700/38=18, which is sufficient to cover 8 resolvable spectral points (200/25=8) determined by the chirping of laser pulses. On the other hand, a commercial lock-in amplifier with a bandwidth of 203 kHz may only allow for 203/38=5.3 resolvable points. In such case, the number of resolvable spectral points is determined by the bandwidth of the lock-in amplifier instead of the chirping of laser pulses.

Figure 7:
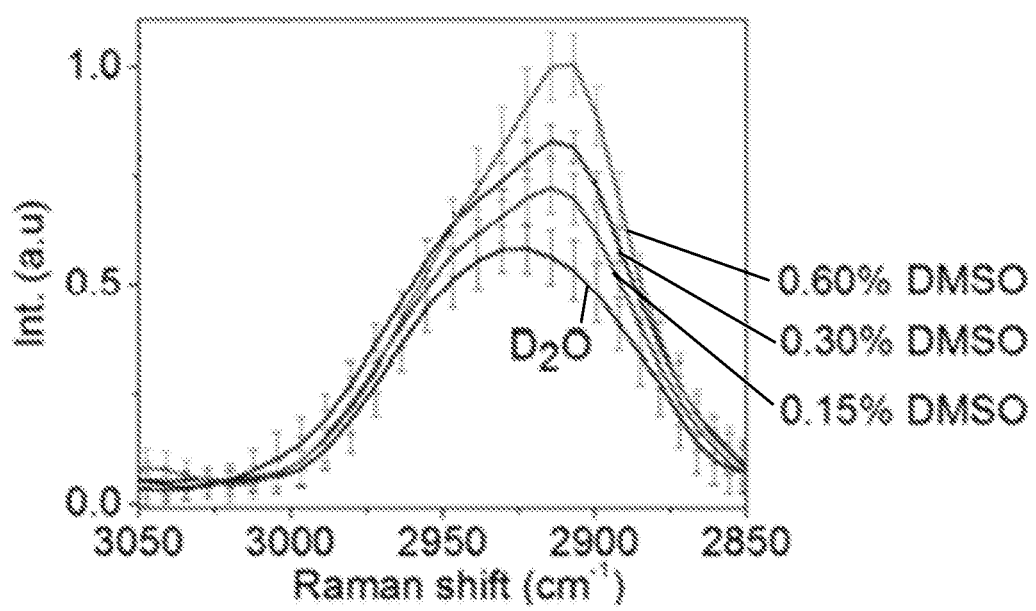
FIG. 7 shows a graphical illustration of a MCR output spectra of $D_2O$ and concentrations of DMSO.

Compared to the femtosecond pulse shaping techniques used in previous microscopy techniques for microsecond SRS spectroscopic imaging, the main advantage of embodiments of the present disclosure is the use of spectrally focused femtosecond pulses for the utilization of the full spectral bandwidth in ultrashort pulses. This advantage also leads to better detection sensitivity. To quantify the sensitivity, SRS spectra was acquired from DMSO solutions diluted with $D_2O$, as shown in FIG. 7. $D_2O$ exhibited a background contributed by cross-phase modulation, while DMSO showed a distinct Raman peak at 2912 $cm^{-1}$. A digital lock-in amplifier of about 203 kHz bandwidth was used to extract the amplified signals by the resonant circuit. The error bar shown in the spectral profiles was the standard deviation from 9 spectroscopic measurements. Under a pixel dwell time of about 83 μs, a signal-to-noise ratio of 2.7 was detected using a 0.15% DMSO solution (21.2 mM). This detection sensitivity was 3.3 times better than previously used methods under the same integration time, which may be attributed to the higher remaining laser power of about 330 mW after the optical setup for microsecond delay-line tuning.

Figure 8A:
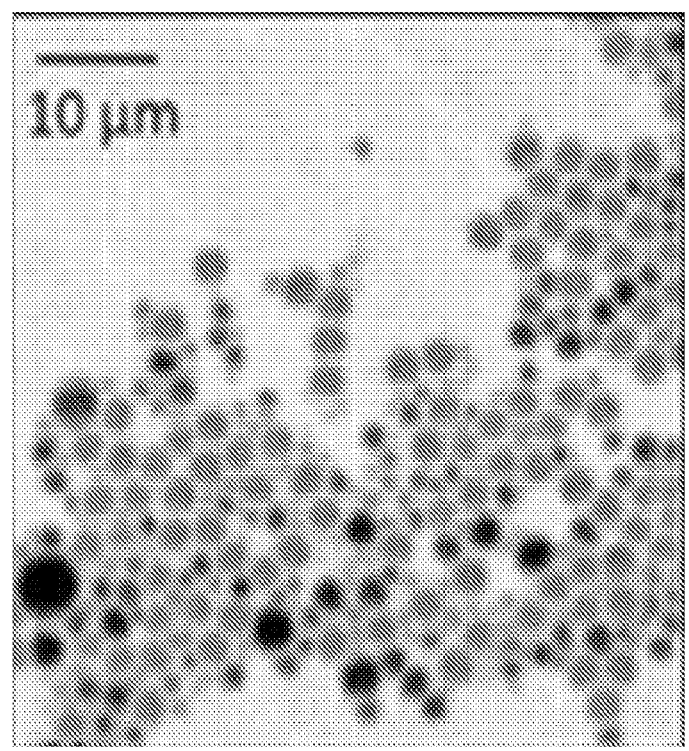
FIG. 8A shows a graphical illustration of a raw SRS image at 2916 $cm^{-1}$ of a PS and PMMA microsphere mixture.
Figure 8B:
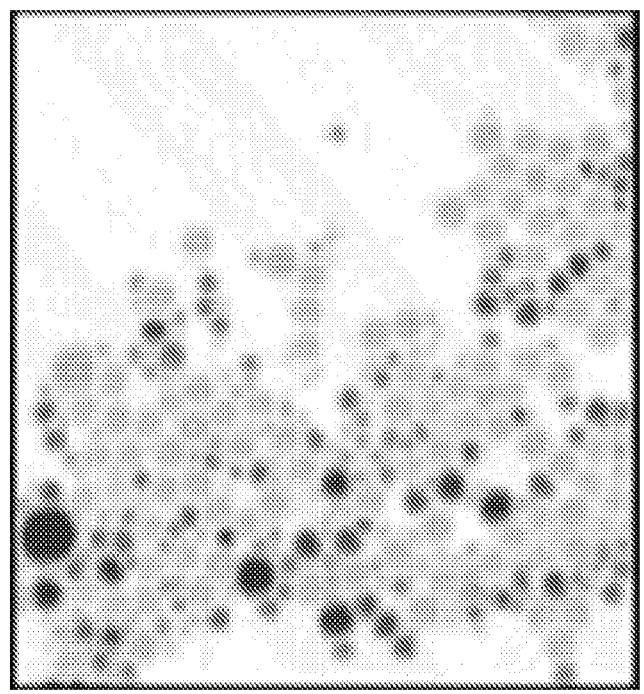
FIG. 8B shows a graphical illustration of a MCR output concentration map of FIG. 8A.
Figure 8C:
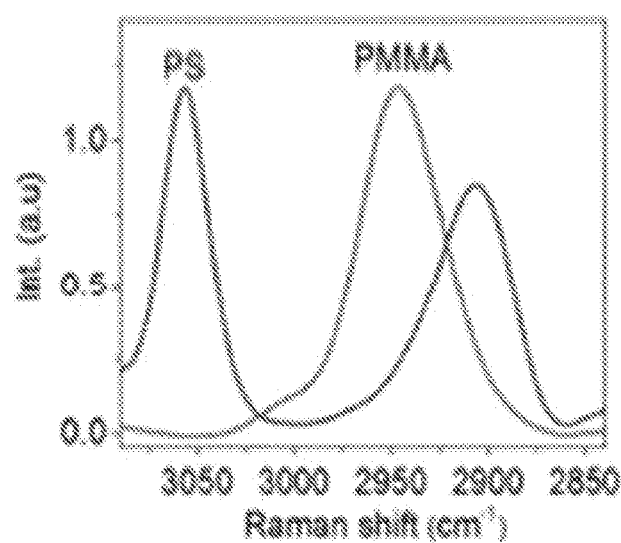
FIG. 8C shows a graphical illustration of a MCR output spectra of PS and PMMA of FIG. 8B.

Real-time spectroscopic imaging platform enabled by microsecond delay-line tuning may be demonstrated by scanning a sample of mixed microspheres of polystyrene and poly(methyl methacrylate), and acquired 160,000 spectra pixel-by-pixel, which is illustrated in FIGS. 8A-C. The image was composed of 400×400 pixels and the dwell time was about 83 μs. The reconstructed SRS image at 2916 $cm^{-1}$ showed the morphology of the mixture. The spectroscopic image data was denoised and decomposed by multivariate curve resolution (MCR) analysis with previously reported algorithms (D. L. Zhang, P. Wang, M. N. Slipchenko, D. Ben-Amotz, A. M. Weiner, and J.-X. Cheng, Analytical Chemistry 85, 98-106 (2013).) The MCR output concentration maps of polystyrene and poly(methyl methacrylate) indicated their spatial distributions, and the output spectra matched the spontaneous Raman data shown in FIG. 2B.

Figure 3A:
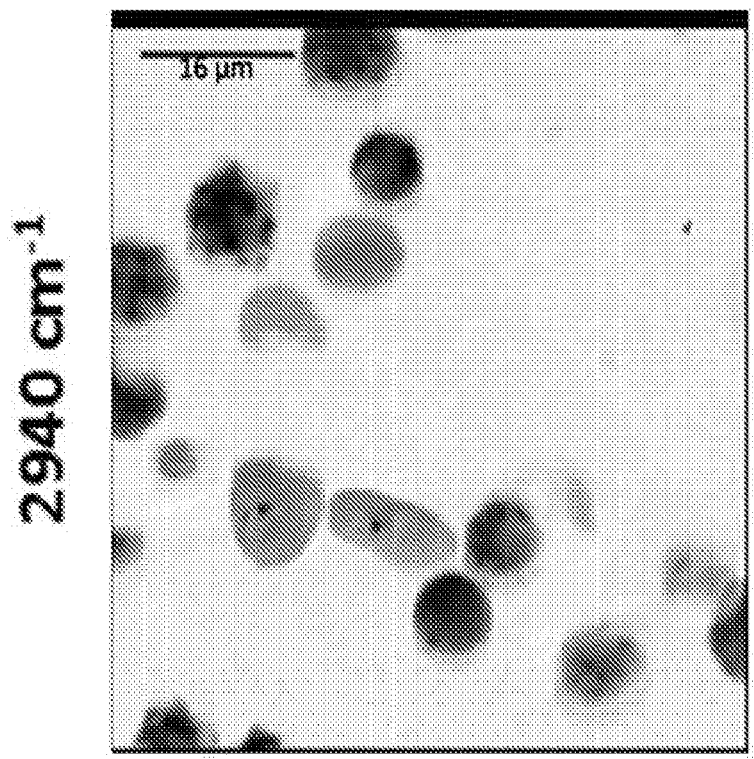
FIG. 3A shows a graphical illustration of a SRS spectroscopic images of blood cells mixed with C. albicans at 2940 $cm^{-1}$.
Figure 3B:
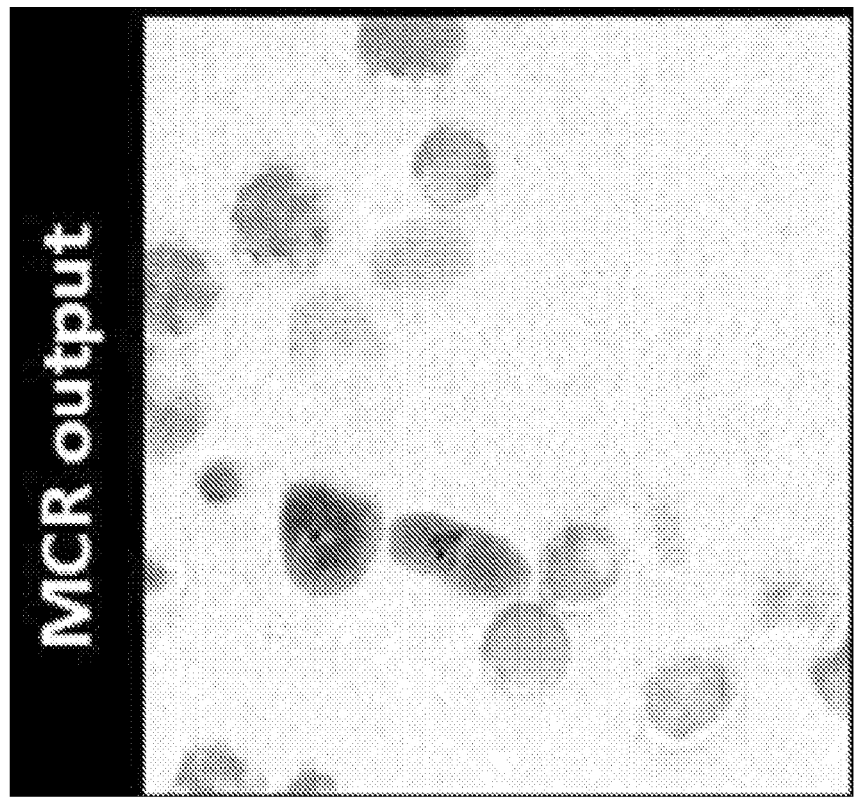
FIG. 3B shows a graphical illustration of the MCR output concentration map of FIG. 3A.
Figure 3C:
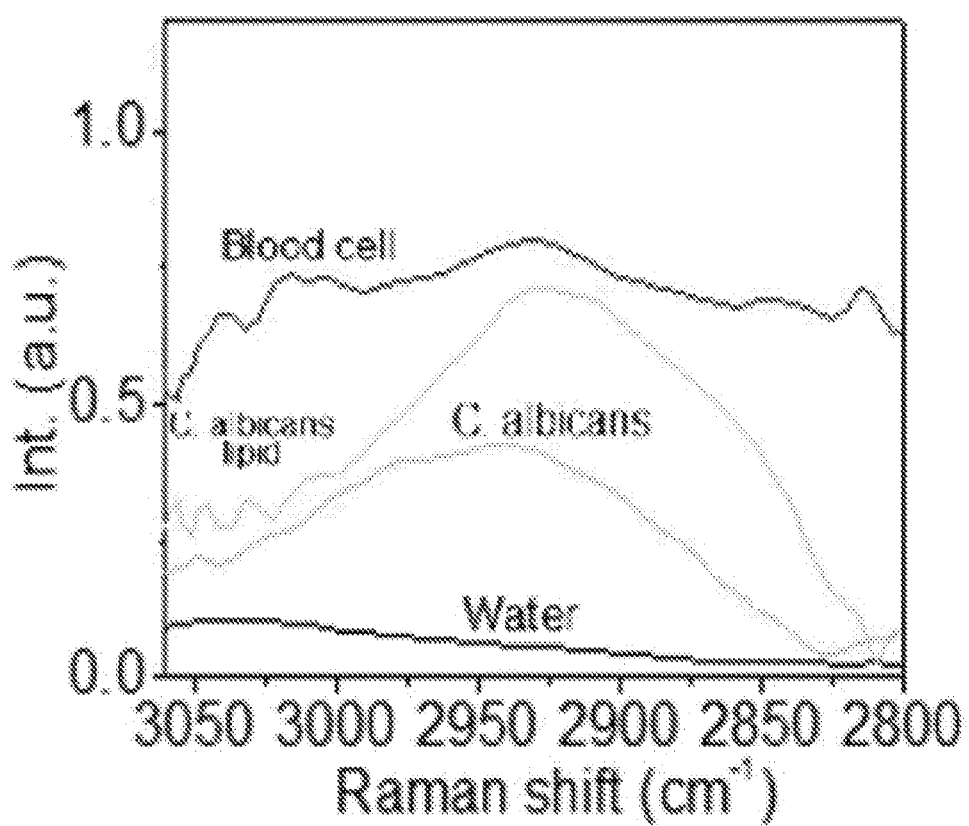
FIG. 3C shows a graphical illustration of the MCR output spectral profiles of FIG. 3B.
Figure 3D:
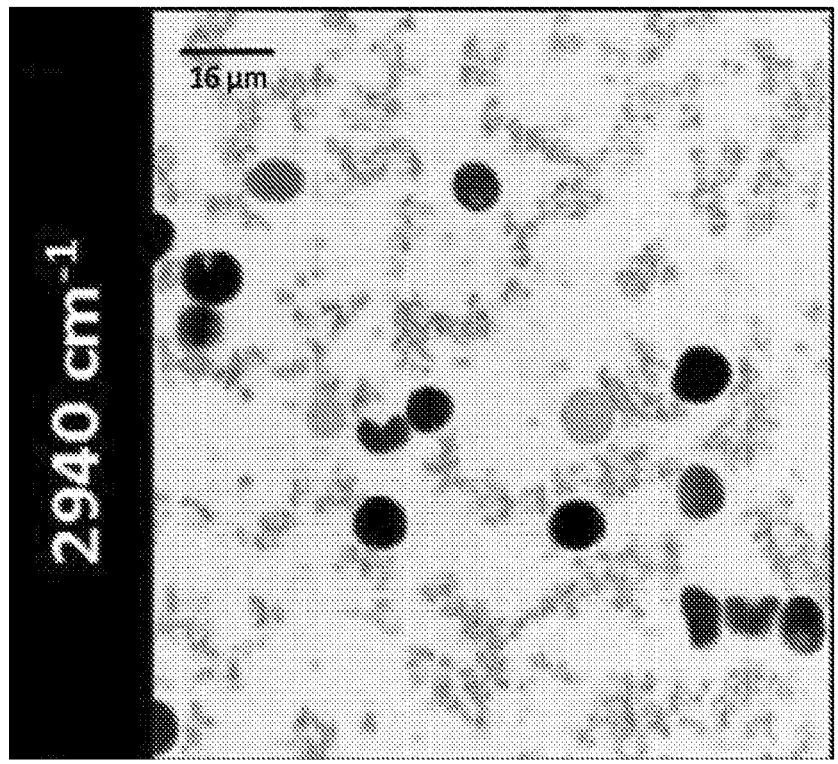
FIG. 3D shows a graphical illustration of a SRS image of blood cells mixed with S. aureus at 2940 $cm^{-1}$.
Figure 3E:
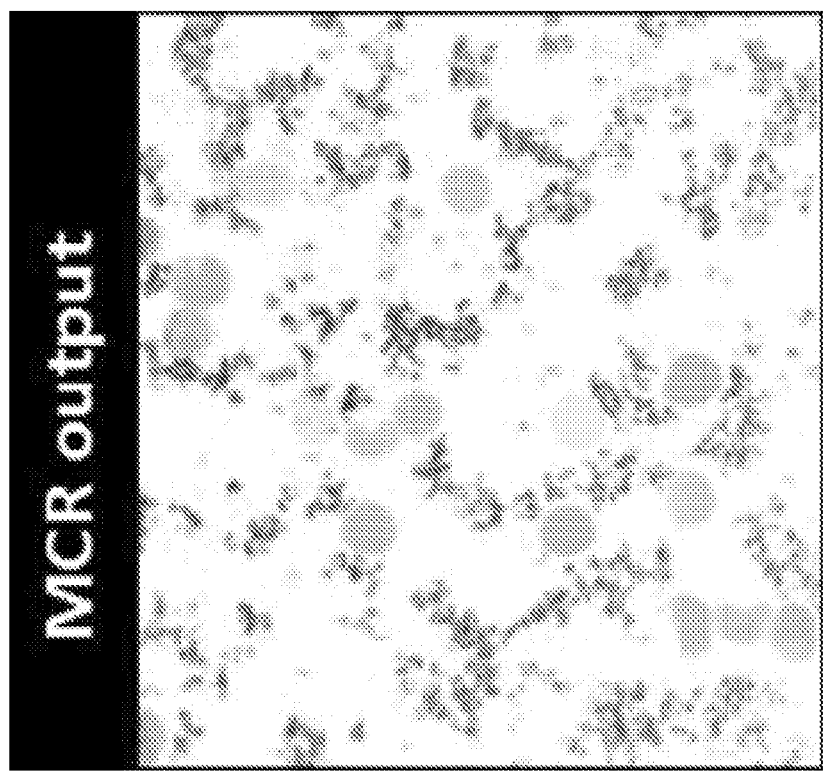
FIG. 3E shows a graphical illustration of the MCR output concentration map of FIG. 3D.
Figure 3F:
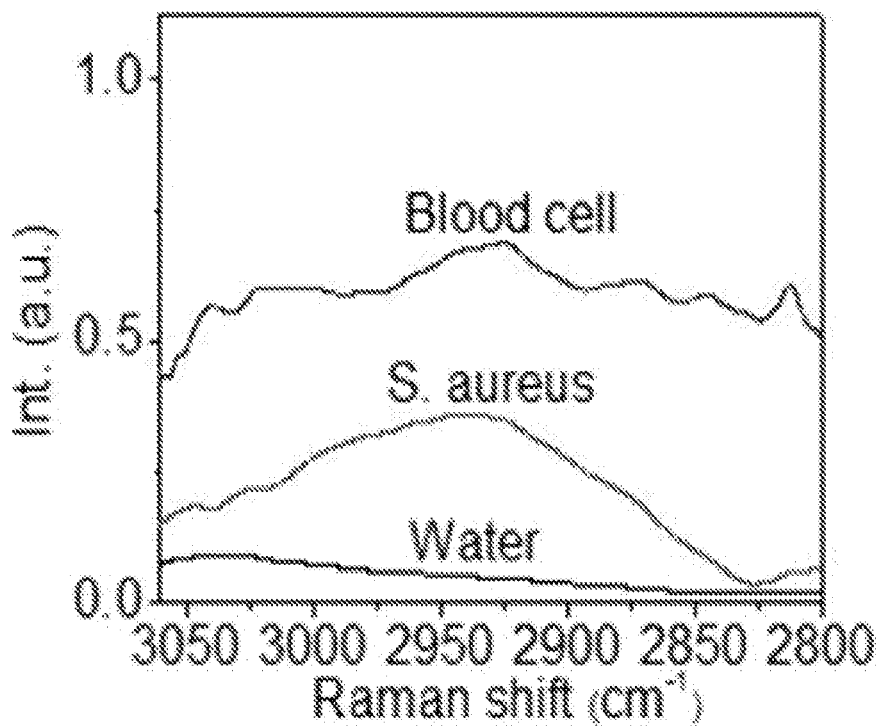
FIG. 3F shows a graphical illustration of the MCR output spectral profiles of FIG. 3E.

The imaging system 100 of the present disclosure can resolve chemical compositions of highly dynamic living cells, enabling rapid detection and analysis of pathogenic microorganisms, such bacteria or fungi, in their natural environment, which is critical for the clinical diagnosis or food safety purposes. SRS spectroscopic imaging of human blood sample mixed with living fungal cells *Candida albicans* (*C. albicans*), a species of *Candida* genus that can cause the candidiasis infection in humans was performed. At 2940 $cm^{-1}$, all cells exhibited SRS signals with comparable signal intensities and shown in FIG. 3A. In the spectral domain *C. albicans* cell bodies exhibited a strong Raman signal at 2940 $cm^{-1}$ contributed by the CH3 vibrations from protein, while the lipid droplets showed an intense signal at 2850 $cm^{-1}$ peak from CH2 vibrations. Blood cells, which were mostly dominated by red blood cells, showed broadband spectral profiles due to transient absorption signals from hemoglobin. FIGS. 3B-3C illustrate MCR analysis further decomposed the spectral features and distinguished *C. albicans* from red blood cells. Another common infection cause of skin and respiratory infections as well as food poisoning, *Staphylococcus aureus* (*S. aureus*), can also be separated from the human red blood cells in the spectral window of 2800-3000 $cm^{-1}$ shown in FIGS. 3D-3F.

Figure 9:
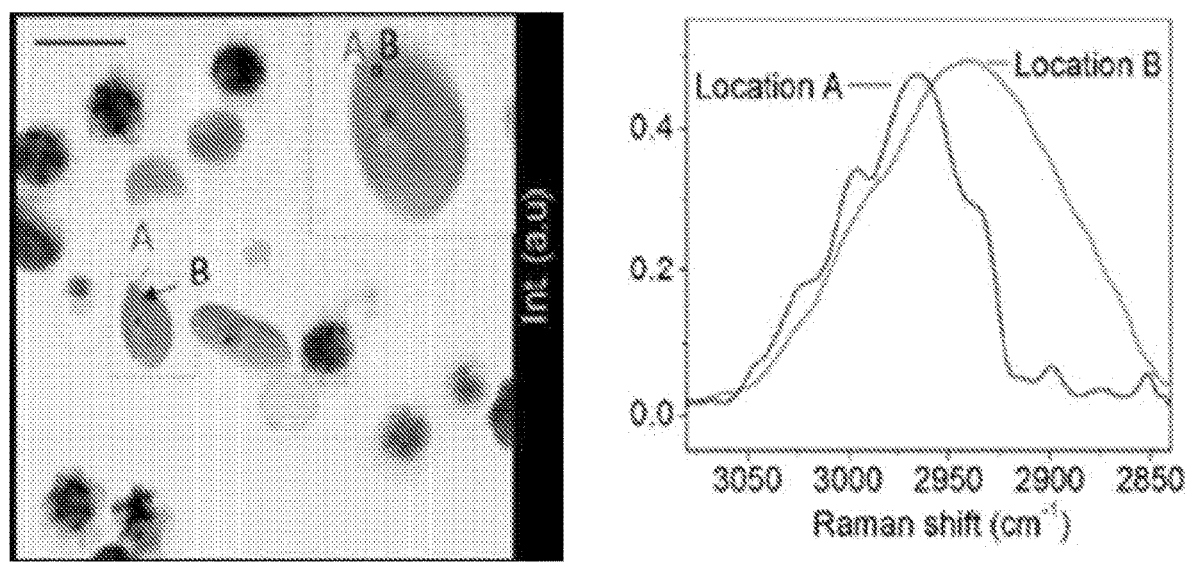
FIG. 9 shows a graphical illustration of spectral distortion due to sample movement.

The influence of slow spectral acquisition speed on spectral profiles was shown by performing SRS spectroscopic imaging by tuning the delay-line system via a motorized translational stage. Live *C. albicans* in blood was imaged using the SRS microscope having a motorized translational stage for delay-line tuning. At each Raman shift, an image composed of 400×400 pixels with a pixel dwell time of 1 μs was acquired, and the total acquisition time for 60 frames was ~30 seconds, covering 200 $cm^{-1}$. Since the blood cells and *C. albicans* can move freely in solution, the location and orientation of every cell changed within one spectroscopic image stack. This sample movement severely perturbed the spectroscopic measurement and resulted in false spectral feature as shown in FIG. 9. Location A (close to the edge of cell body) and B (in cell body) contained 9 pixels. The spectral distortion shown in location A was due to the cell movement.

Figure 10A:
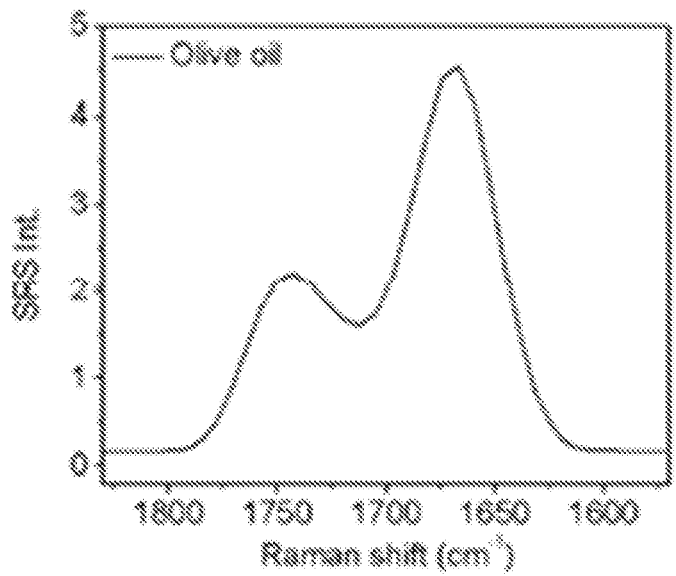
FIG. 10A shows a graphical illustration of spectral profiles of olive oil in fingerprint region using a microsecond stimulated Raman spectroscopy of the present disclosure.
Figure 10B:
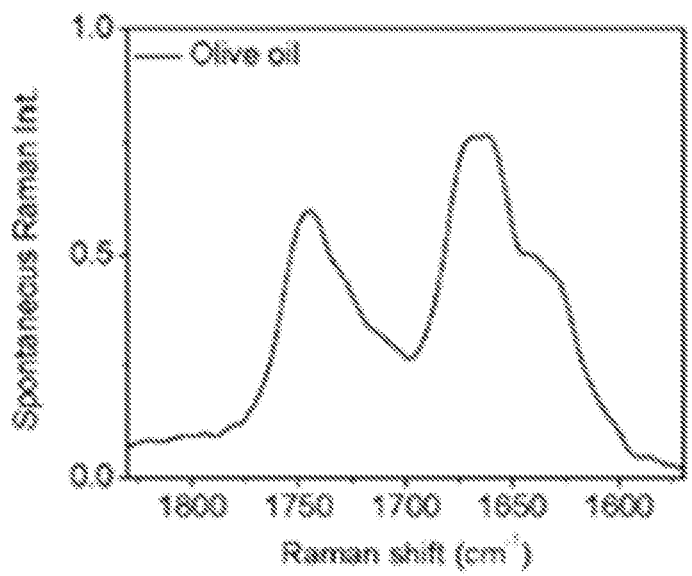
FIG. 10B shows a graphical illustration of spectral profiles of olive oil in fingerprint region using spontaneous Raman spectroscopy.

Additionally, the system of the present disclosure is able to acquire SRS spectra in the molecular fingerprint region. A pump laser at about 887 nm and Stokes laser at about 1040 nm can be used and corresponds to 1658 $cm^{-1}$. A calibration curve of Raman shift in C—H region with a central Raman shift of 2916 $cm^{-1}$ shown in FIG. 2 can be subtracted with 2916-1658=1258 $cm^{-1}$ allowing for the calibration curve in C—H region to be converted to fingerprint spectral window. Acyl C═C bond at 1655 $cm^{-1}$ and ester C═O bond at 1745 $cm^{-1}$ can be resolved by the system being configured to the spectral window of about 1600-1800 $cm^{-1}$ and acquired an SRS spectrum from olive oil. Two peaks at about 1655 $cm^{-1}$ and about 1745 $cm^{-1}$ were distinguished and matched with spontaneous Raman spectroscopy. The results of these images are illustrated in FIGS. 10A-B.

The imaging system of the present disclosure can further quantify the fat storage in 3-D in a live *C. elegans*. *C. elegans* is an intact multicellular animal that is extensively used for studying the impact of lipid metabolism on aging and disease. Single color CRS imaging using C—H vibrational region has been demonstrated in previous experiments to visualize the lipid storage, but the quantification remains difficult because most of compartments exhibit Raman signal in C—H region. SRS spectroscopic imaging has been applied to identify and quantify lipid compartments at a cross-section of C. elegans based on the Raman region from about 1620 to 1800 cm$^{-1}$, where the ratio of acyl C=C bond at 1655 cm$^{-1}$ to ester C=O bond at 1745 cm$^{-1}$ were used to identify different compartments (P. Wang, B. Liu, D. L. Zhang, M. Y. Belew, H. A. Tissenbaum, and J.-X. Cheng, Angewandte Chemie-International Edition 53, 11787-11792 (2014)). In this study, fat stores were found to exhibit higher ratio of C=O to C=C than lysosome-related organelles (LROs), while protein showed very weak signal at C=O band. In addition, oxidized lipid droplets exhibited a shoulder at about 1680 cm$^{-1}$ in the region of C=C band. However, C. elegans usually has several tens of micrometers thick body, therefore 3-D chemical mapping of the lipid compartments is necessary to quantify the fat storage. The system of the present disclosure allows 4-D SRS imaging (x-y-z-λ) of C. elegans in the fingerprint region. 4-D SRS images (x-yz-λ) of an anesthetized C. elegans in the same spectral window was performed. Each image composed of 170×1700 pixels can be collected within about 25 seconds, and 14 depth-resolved images were acquired with about a 2-μm step size tuned manually by the microscope stage.

Figure 4A:
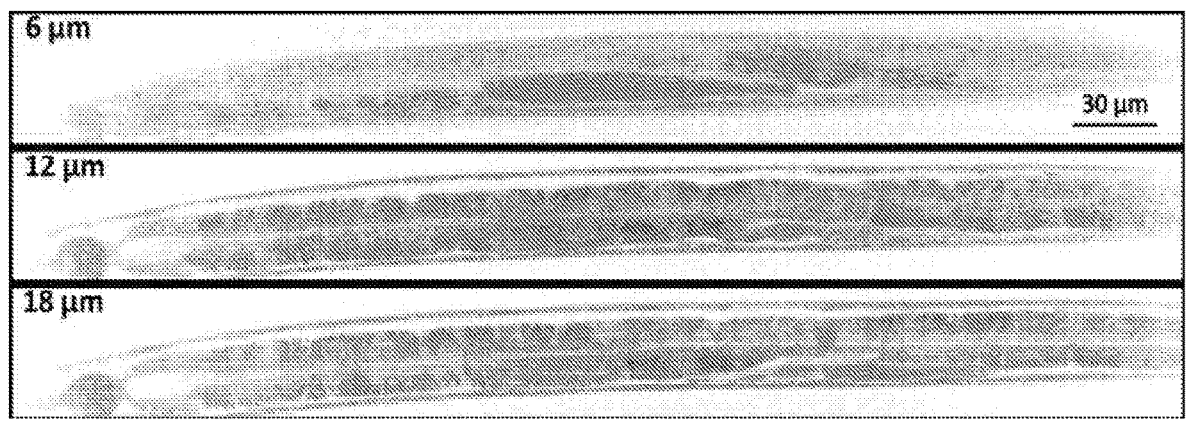
FIG. 4A shows a graphical illustration of a SRS spectroscopic images of C. elegans at 6, 12 and 18 μm depths from the surface.
Figure 4B:
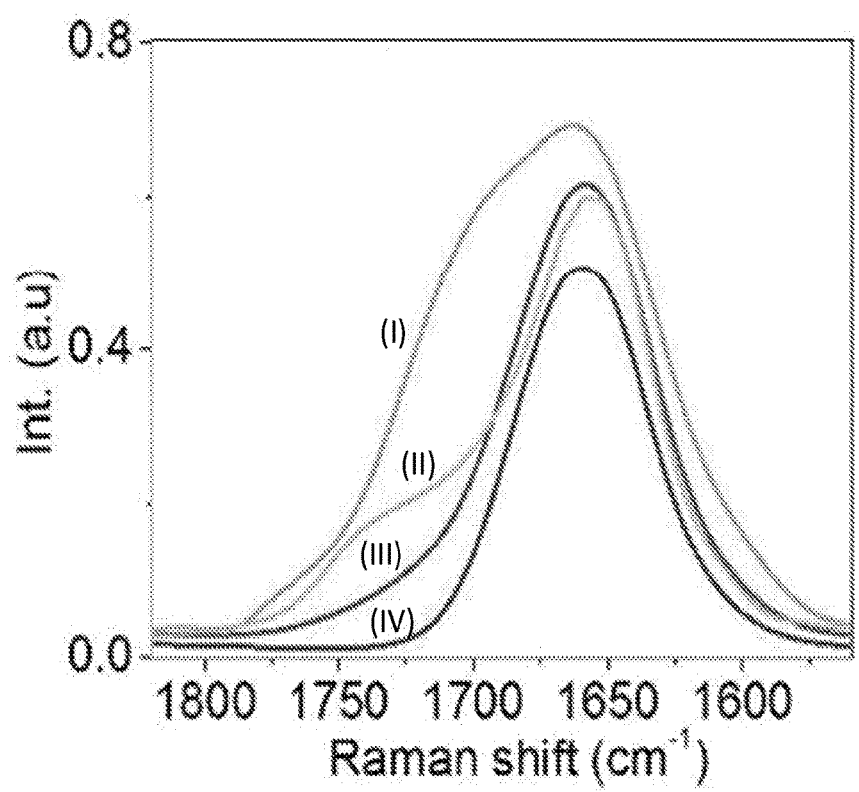
FIG. 4B shows a graphical illustration of a MCR output spectra of (I) oxidized lipid, (II) fat store, (III) LRO, and (IV) protein.
Figure 11:
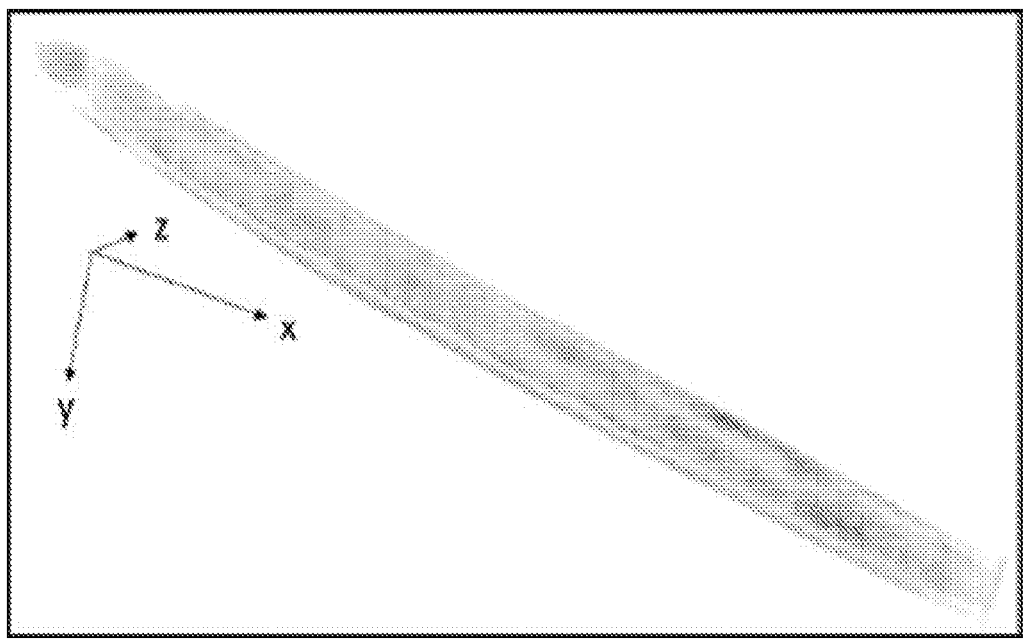
FIG. 11 shows a graphical illustration of a 3-D visualization of fat storages, LROs and oxidized lipid droplets in C. elegans.

A visualization showed the spectroscopic image stack at the depth of 14 μm from the surface, and another visualization presented 3-D image stack at 1675 cm$^{-1}$. The 4-D image stack was then denoised and decomposed by MCR analysis. FIG. 4A shows the depth-resolved chemical maps of fat storage, LRO, oxidized lipid droplet and protein, with their corresponding MCR spectral outputs shown in FIG. 4B. The fat stores exhibited Raman peaks at about 1655 cm$^{-1}$ and 1745 cm$^{-1}$. The LROs showed a peak at about 1655 cm$^{-1}$ and a weaker signal at 1745 cm$^{-1}$. The oxidized lipid droplets exhibited signals in the C=C and C=O regions together with a shoulder around 1700 cm$^{-1}$. Finally, the proteins showed a Raman peak at 1655 cm$^{-1}$. FIG. 11 further provides a reconstructed the 3-D visualization of the C. elegans in which the fat storage in intestinal cells over the entire worm body is clearly resolved.

The present disclosure provides a real-time SRS spectroscopic imaging based on microsecond delay line tuning. The SRS spectrum at each pixel was acquired within 83 μs, covering 200 cm$^{-1}$ spectral window with a 25 cm$^{-1}$ spectral resolution. The speed advantage provides chemical imaging of highly dynamic systems. Identification of pathogenic microorganisms, including bacteria and fungi, in blood samples were demonstrated. The system of present disclosure also enables 3-D chemical mapping of fat storage in live C. elegans and other microorganism. Collectively, the presented system enables the use of Raman spectroscopy for early detection of microorganisms and compositional mapping of intracellular compartments in a living organism.

Figure 12:
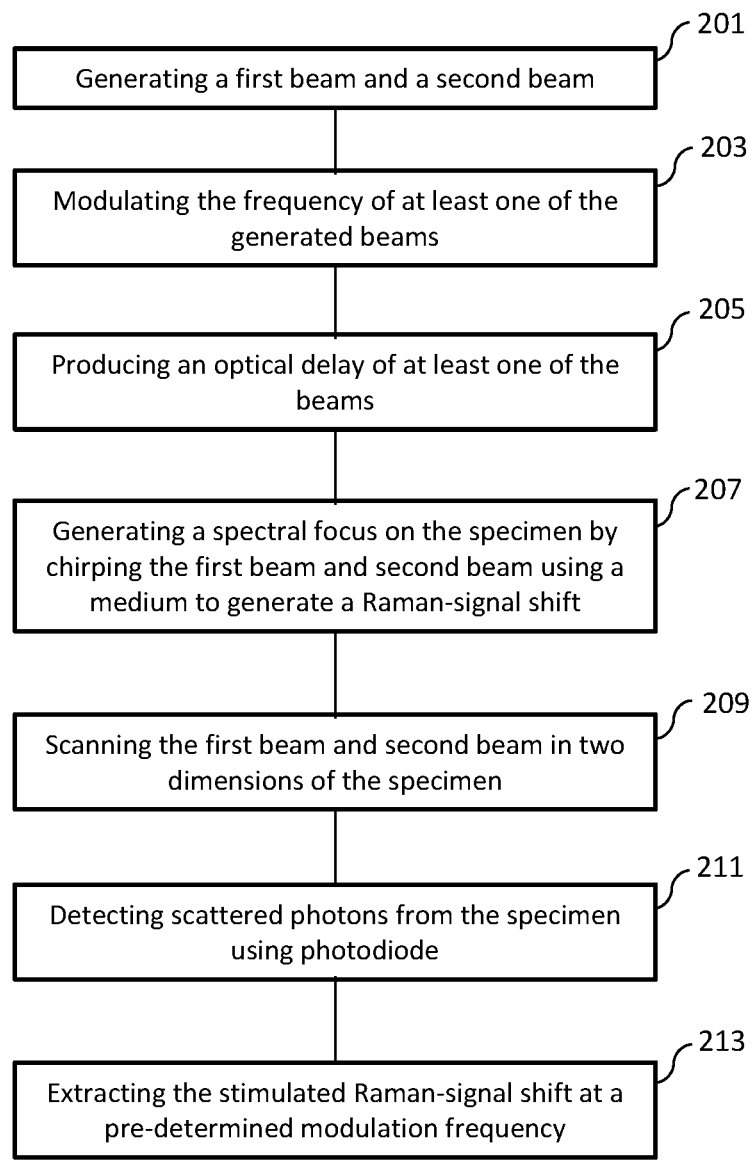
FIG. 12 is a flow diagram of an exemplary method for imaging a specimen using a system of the present disclosure.

FIG. 12 illustrates a method for imaging a specimen using a microsecond-scale stimulated Raman spectroscopic imaging method. The method includes generating a first beam and a second beam (Step 201). This can be accomplished using any suitable light source, such as a femtosecond laser generator. The beams produced can be a Stokes beam and a pump beam. The frequencies of one or both of the beams can then be modulated (Step 203). The modulation of the beam frequencies can be done at a pre-determined frequency for each or both of the beams. At least one of the beams can have an optical delay produced (Step 205). The delay produced can be accomplished using a delay-line tuning system of the present disclosure. The optical delay can cause the beam to experience a millimeter-scale difference in optical path length. A spectral focus on the specimen can be generated by chirping the first and second beam using a medium to generate a Raman-signal shift (Step 207). The chirping can be carried out by one or more rods. The first beam and second beam can then be used to scan the specimen (Step 209). The scanning can include scanning for the temporal delay of one of the beam pulses. A galvo mirror system can also be used along with the delay-line tuning system for scanning the specimen. Scattered photons from the specimen can then be detected using a photodiode (Step 211). The photons can be focused and filtered onto the photodiode. The stimulated Raman-signal shift can then be extracted (Step 213). The extraction of the Raman-signal shift can be done at a pre-determined modulation frequency used by the imaging system.

Those skilled in the art will appreciate that numerous modifications and variations may be made to the above disclosed embodiments without departing from the spirit and scope of the invention. It will be apparent to those skilled in the art that various modifications and variations can be made in the disclosed system and method without departing from the scope of the disclosure. Other embodiments will be apparent to those skilled in the art from consideration of the specification and practice of the various implementations disclosed herein. It is intended that the specification and examples be considered as exemplary only, with a true scope being indicated by the following claims and their equivalents.

What is claimed is:

1. A microsecond-scale stimulated Raman spectroscopic imaging system, comprising:
    a laser output with configured to produce at least two femtosecond beams;
    a modulator configured to modulate at least one of the femtosecond beams intensity at a frequency between about 1 and 100 megahertz;
    a rod configured to chirp the two femtosecond beams to generate a spectral focus in a specimen;
    a mirror pair configured to scan the two femtosecond beams in two dimensions on the specimen;
    an objective lens that focuses the two femtosecond beams onto the specimen;
    a detector that detects scattered photons from the specimen;
    a delay-line tuning system having at least one resonant mirror, wherein the delay-line tuning system is configured to produce an optical delay to the pair of beams in said specimen; and
    a rectifier configured to extract the stimulated Raman-signal shift at the aforementioned modulation frequency.

2. The system of claim 1, wherein the optical delay generated by the delay-line tuning system generates a Raman-signal shift window of about 10 to 500 wavenumbers.

3. The system of claim 2, wherein the optical delay is about 3 picoseconds within about 42 microseconds.

4. The system of claim 1, wherein the optical delay is about 0.5-10 picosecond within 20-2000 microsecond.

5. The system of claim 1, wherein the two femtosecond beams include a Stokes beam and a pump beam.

6. The system of claim 1, wherein the mirror pair comprises at least one galvo-mirrors configured to be synchronized with the resonant mirror of the delay-line tuning system.

7. The system of claim 6, further comprising a digitizer configured to acquire output data from the rectifier.

8. The system of claim 1, wherein the rectifier is a tuned amplifier or lock-in amplifier.

9. The system of claim 1, wherein the rod is an optical glass rod having a refractive index between about 1.7 and 1.95.

10. A method of imaging a specimen, said method comprising the steps of:
generating a first beam and a second beam using a laser generator;
modulating the frequency of at least one of the beams;
producing a an optical delay at least one of the beams in the specimen;
generating a spectral focus on the specimen chirping at the first beam and second beam using a rod to generate a Raman-signal shift;
scanning the first beam and the second beam in at least two dimensions on the specimen;
detecting scattered photons from the specimen using a photodiode; and
extracting the stimulated Raman-signal shift at a predetermined modulation frequency.

11. The method of claim 10, wherein one or more of the beams is modulated at a frequency between about 1 and 100 megahertz.

12. The method of claim 10, wherein the first beam is a Stoke beam and the second beam is a pump beam.

13. The method of claim 12, wherein the first beam and second beam have different wavelengths.

14. The method of claim 10, wherein the first beam and second beam are provided using a femtosecond laser beam generator.

15. The method of claim 10, wherein the chirped beams generate a Raman-signal shift window between about 10 and 500 wavenumbers.

16. The method of claim 10, further comprising focusing the first beam and the second beam on the specimen using a lens.

17. The method of claim 10, wherein prior to being chirped the first beam and the second beam is combined.

18. The method of claim 10, further comprising filtering the scattered photons using a filter after scanning the first beam and the second beam in two dimension on the specimen.

19. The method of claim 10, wherein the rod is an optical glass rod.

20. The method of claim 19, wherein the optical glass rod has a refractive index between about 1.7 and 1.95.

* * * * *